US012752221B2

(12) United States Patent
Liu

(10) Patent No.: US 12,752,221 B2
(45) Date of Patent: Oct. 6, 2026

(54) LIQUID PROCESSING FIXTURE AND DEVICE

(71) Applicant: TRIPLE WIN TECHNOLOGY(SHENZHEN) CO.LTD., Shenzhen (CN)

(72) Inventor: Kai Liu, Shenzhen (CN)

(73) Assignee: TRIPLE WIN TECHNOLOGY(SHENZHEN) CO.LTD., Shenzhen (CN)

( * ) Notice: Subject to any disclaimer, the term of this patent is extended or adjusted under 35 U.S.C. 154(b) by 1317 days.

(21) Appl. No.: 17/564,572

(22) Filed: Dec. 29, 2021

(65) Prior Publication Data

US 2023/0061852 A1 Mar. 2, 2023

(30) Foreign Application Priority Data

Aug. 27, 2021 (CN) ......................... 202110997633.4

(51) Int. Cl.
*B01D 19/00* (2006.01)
*B01D 19/02* (2006.01)
*B04B 7/08* (2006.01)

(52) U.S. Cl.
CPC ......... *B01D 19/0052* (2013.01); *B01D 19/02* (2013.01); *B04B 7/08* (2013.01)

(58) Field of Classification Search
CPC ...... B01D 19/0052; B01D 19/02; B04B 7/08; A61M 5/24; A61M 5/2033; A61L 2202/23; A61L 9/12; A61J 1/16
USPC ................................................ 494/16, 20, 82
See application file for complete search history.

(56) References Cited

U.S. PATENT DOCUMENTS

| | | | | | |
|---|---|---|---|---|---|
| 4,208,484 | A | * | 6/1980 | Sogi | C12M 33/10<br>435/286.2 |
| 5,584,790 | A | * | 12/1996 | Bell | G01N 33/491<br>494/20 |
| 5,665,047 | A | * | 9/1997 | Brimhall | B04B 5/0414<br>494/37 |

FOREIGN PATENT DOCUMENTS

| | | | | |
|---|---|---|---|---|
| CN | 2776559 | Y | * | 5/2006 |
| CN | 206009011 | U | * | 3/2017 |
| CN | 208320846 | U | * | 1/2019 |
| CN | 212882986 | U | * | 4/2021 |
| CN | 213884362 | U | | 8/2021 |
| TW | M384709 | U1 | | 7/2010 |

* cited by examiner

*Primary Examiner* — Claire X Wang
*Assistant Examiner* — Shuyi S. Liu
(74) *Attorney, Agent, or Firm* — ScienBiziP, P.C.

(57) ABSTRACT

A firm and stable liquid processing fixture for clamping a liquid container undergoing a centrifuge process includes a mounting plate, a cover plate, and a fixing element. The mounting plate defines a fixing groove for receiving the liquid container. The cover plate is rotatably connected to the mounting plate, and is positioned at a side of the mounting groove. The cover plate is turned over to cover the mounting groove. The fixing element is connected to the mounting plate. The cover plate is detachably connected to the fixing element. The liquid processing fixture further fixes the liquid container in place by setting the cover plate on the mounting groove and fixing it with the fixing portion, and provides firm installation and simple operation. A liquid processing device is also disclosed.

5 Claims, 3 Drawing Sheets

Prior Art

LIQUID PROCESSING FIXTURE AND DEVICE

FIELD

The subject matter herein relates to manufacturing, particularly a liquid processing fixture and a liquid processing device.

BACKGROUND

Glue defoaming is a treatment applied to liquid glue to separate air bubbles in the glue using the centrifugal force generated by high-speed rotation. Such a process prevents non-bonded spots. It is also an essential auxiliary equipment in the dispensing process. Existing liquid treatment equipment uses a rubber plug slot with a matching shape to fix the liquid container, as it shown in FIG. 1. This type of fixing can be unstable in operation fixation, and allow pollution of the machine.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DESCRIPTION OF MAIN COMPONENTS OR ELEMENTS

Figure 1:
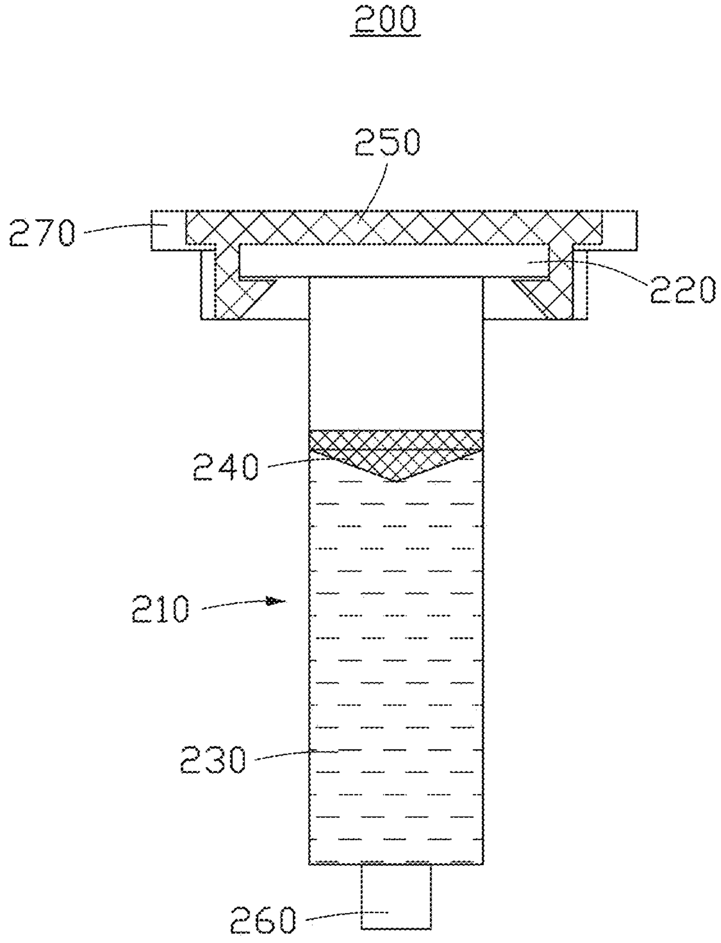
FIG. 1 is a schematic view of a liquid processing fixture in the prior art.

Liquid processing fixture 100;
Mounting plate 10;
Fixing groove 11;
First groove 111;
Second groove 112;
Third groove 113;
First step surface 114;
Second step surface 115;
Cover plate 12;
First end portion 121;
Second end portion 122;
Fixing element 13;
First portion 131'
Second portion 132;
Supporting member 14;
Sleeve portion 141;
Positioning portion 142;
Baffle 20;
Elastic member 30;
First end 31;
Second end 32;
Liquid container 200;
Containing body 210;
Container mouth 220;
Liquid 230;
Rubber cap 240;
Upper cover 250;

Lower plug 260;
Fixture 270;
Liquid processing device 300;
Body 310;
Top cover 320;
Driving device 330;
Rotating part 340.

DETAILED DESCRIPTION

In order to make the above-mentioned objects, features, and advantages of the present application more obvious, a description of specific embodiments of the present application will be described with reference to the accompanying drawings. The present application can be implemented in many ways different from those described herein, and those skilled in the art can make similar improvements without violating the contents of the present application. Therefore, the present application is not to be considered as limiting the scope of the embodiments to those described herein.

Several definitions that apply throughout this disclosure will now be presented.

Unless otherwise defined, all technical and scientific terms used herein have the same meaning as commonly understood by one skilled in the art. The terms used in the present application herein are only for describing specific embodiments, and are not intended to limit the present application.

Referring to FIG. 1, a circular container mouth 220 of a liquid container 200 abuts against a fixture 270 of the prior art. An upper cover 250 is connected to the container mouth 220, and the fixture 270 defines a groove, the groove of the fixture 270 matches with the upper cover 250. The upper cover 250 is positioned in the groove to fix the liquid container 200 in place. Since the force on the liquid container 200 is only provided by the groove of the fixture 270, the fixing of the liquid container 200 is not firm.

Figure 2:
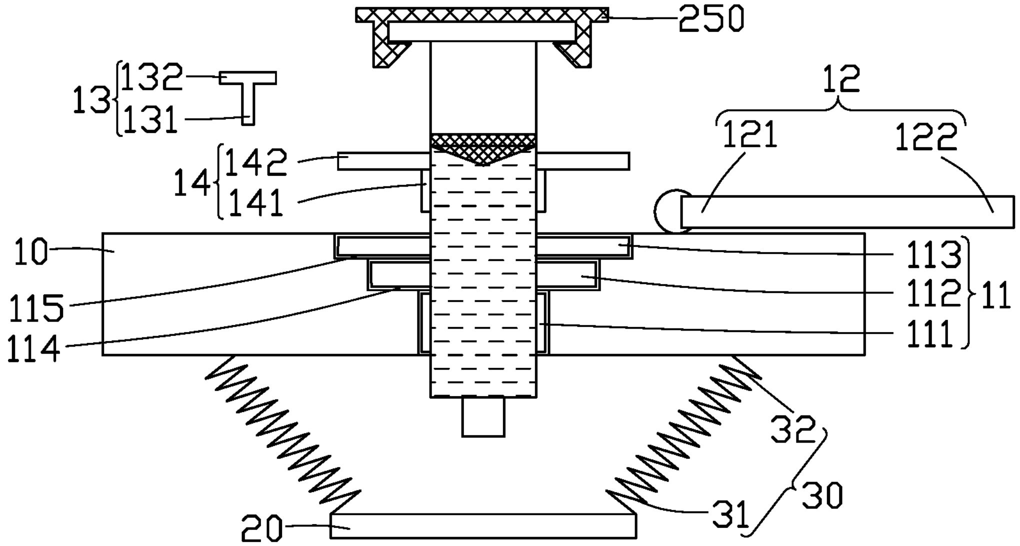
FIG. 2 is a schematic view of a liquid processing fixture in an embodiment according to the present disclosure.

Referring to FIG. 2, the present disclosure discloses a liquid processing fixture 100 for clamping the liquid container 200. The liquid processing fixture 100 includes a mounting plate 10, a cover plate 12, and a fixing element 13.

The mounting plate 10 defines a mounting groove 11 for receiving the liquid container 200. The cover plate 12 includes a first end portion 121 and a second end portion 122. The first end portion 121 is rotatably connected to the mounting plate 10. The cover plate 12 is positioned at a side of the mounting groove 11. The cover plate 12 is changeable between a closed state to cover the mounting groove 11 and an open state to uncover the mounting groove 11. The fixing element 13 is connected to the mounting plate 10. The second end portion 122 of the cover plate 12 is detachably connected to the fixing element 13.

Specifically, the liquid container 200 includes a hollow cylindrical containing body 210. The containing body 210 contains the liquid 230 to be treated by a process, and the containing body 210 is sealed by a rubber cap 240. The container mouth 220 is defined at an end of the liquid container 200, and a diameter of the container mouth 220 is larger than a diameter of the containing body 210. The upper cover 250 is coupled on the top portion of the container mouth 220.

In the present disclosure, the cover plate 12 is reversibly connected to the top of the mounting plate 10, and the cover plate 12 is positioned or unlocked through the removable fixing element 13. In order to adapt to a greater number of liquid container 200, the section of mounting groove 11 includes, but is not limited to, a circle. The section of the cover plate 12 includes, but is not limited to, a circle to cover the entire mounting slot 11. The cover plate 12 when fully covering can apply uniform stress on the liquid container 200, and avoid splashing of contents when the liquid container 200 is damaged and other conditions leading to liquid leakage.

When using the liquid processing fixture 100, the liquid container 200 is positioned on the mounting plate 10, the cover plate 12 is turned over to cover the mounting groove 11, and the cover plate 12 is fixed by the fixing element 13, so that the cover plate 12 can apply a pressing force on the liquid container 200 through the upper cover 250, to achieve firmer clasping and positioning of the liquid container 200. The arrangement of the cover plate 12 and the fixing element 13 has the effect of firmly fixing the liquid container 200.

In an embodiment of the present disclosure, the liquid processing fixture 100 further includes a supporting member 14. The supporting member 14 is sleeved on the outside of the containing body 210 and positioned below the upper cover 250.

Furthermore, the supporting member 14 may include a series of supporting members 14 of different specifications to adapt to liquid containers 200 of different specifications. The supporting member 14 is sleeved on a middle portion of the liquid container 200, and the side of the supporting member 14 is closely supported by the periphery in the mounting groove 11, thus the liquid container 200 is further fixed by the mounting plate 10.

In an embodiment of the present disclosure, the supporting member 14 may include a sleeve portion 141 and a positioning portion 142. The sleeve part 141 is sleeved on the containing body 210 and positioned in the mounting groove 11. The positioning portion 142 is connected to the sleeve portion 141.

It should be noted that, the sleeve portion 141 is closely attached to the outer surface around the containing body 210, and then positioned in the mounting groove 11 to fit the side of the mounting plate 10 adjacent to the mounting groove 11. The positioning portion 142 may be connected to the top of the sleeve part 141, extending outward along a radial direction of the sleeve portion 141 to achieve the positioning. The positioning portion 142 is provided to position the liquid container 200 further firmly. The material of the supporting member 14 includes a flexible material which is deformable. The sleeve portion 141 and the positioning portion 142 may be connected in one piece, such as by injection molding, blow molding, pressing and other molding methods.

In one embodiment, the mounting groove 11 defines a first groove 111, a second groove 112, and a third groove 113 positioned in that order. From the perspective shown in FIG. 2, areas of the first groove 111, the second groove 112, and the third groove 113 at planes parallel to a radial direction of the first groove increase in size in the sequence. The positioning portion 142 is positioned in the first groove 111, a first step surface 114 is formed between the first groove 111 and the second groove 112, and the first step surface 114 abuts the positioning portion 142 of the supporting member 14. The second groove 112 is located between the first groove 111 and the third groove 113, and a second step surface 115 is formed between the second groove 112 and the third groove 113, the second step surface 115 abuts the upper cover 250. The third groove 113 receives and holds the upper cover 250.

It should be noted that, the first groove 111, the second groove 112, and the third groove 113 can be, but are not limited to being, cylindrical, and their diameters increase in their turn. The first groove 111 is located at a bottom of the mounting groove 11, the sleeve portion 141, and the containing body 210 of the supporting member 14 are successively contained in the first groove 111 from outside to inside. The second groove 112 is located above the first groove 111. The diameter of the second groove 112 is larger than the diameter of the first groove 111, and a first step surface 114 is formed between the second groove 112 and the first groove 111. The first step surface 114 abuts the positioning portion 142 of the supporting member 14 to achieve approximate positioning of the liquid container 200. The third groove 113 is located above the second groove 112. The diameter of the third groove 113 is larger than the diameter of the second groove 112, and the second step surface 115 is formed between the second groove 112 and the third groove 113. The second step surface 115 abuts the bottom of the upper cover 250. Therefore, the second step surface 115 presses upward on the container mouth 220 through the upper cover 250 to maintain the position of the liquid container 200. By setting the grooves in multiple stages, the firm positioning of the mounting plate 10 to the liquid container 200 is realized, and the liquid container 200 is held firmly in place.

In one embodiment, the liquid processing fixture 100 further includes a baffle 20 and an elastic member 30. The elastic member 30 connects the baffle 20 and the mounting plate 10, and the baffle 20 can move within a range.

In the present disclosure, when the liquid container 200 is penetrated and positioned on the mounting plate 10, the bottom of the liquid container 200 can abut the baffle 20. At this time, the elastic member 30 is in tension, a force being applied to the bottom of the liquid container 200 through the baffle 20. The final positioning of the liquid container 200 is realized through the force applied to the top of the liquid container 200 by the cover plate 12. The elastic member 30 includes but is not limited to being a spring, and a lower plug 260 can be positioned at the bottom of the liquid container 200 to act as buffer between the liquid container 200 and the baffle 20 pressing on it.

In one embodiment, a first end 31 of the elastic member 30 is connected to the periphery of the baffle 20, and a second end 32 of the elastic member 30 is connected to the bottom of the mounting plate 10.

Specifically, the second end 32 of the elastic member 30 is positioned at the bottom of the mounting plate 10 and the periphery of the mounting groove 11. A number of elastic members 30 can be positioned and symmetrically distributed on the peripheral side of the baffle 20, so that the baffle 20 is stressed evenly, and the liquid container 200 is also stressed evenly and positioned stably.

In one embodiment, the fixing element 13 includes a first portion 131 and a second portion 132. The first portion 131 is detachably connected to the mounting plate 10, the second portion 132 is connected to the first portion 131. The second portion 132 abuts the second end portion 122 of the cover plate 12.

It should be noted that, the first portion 131 may be a screw, and a screw hole matching the screw can be set on the mounting plate 10. The first portion 131 can pass through the cover plate 12 to ensure that the second portion 132 is in full contact with, and to limit, the cover plate 12. In other embodiment, the first portion 131 may be inserted in the cover plate 12 without passing though, to create partial contact between the second part 132 and the cover plate 12, to limit the cover plate 12. Therefore, the cover plate 12 is stably positioned in the closed state without being pushed out by the liquid container 200.

In one embodiment, the cover plate 12 defines a positioning hole, the first portion 131 is positioned in the positioning hole, and the positioning hole can be the screw hole. The cover plate 12 also defines a positioning hole, so that the first portion 131 can pass through the positioning hole, and the second portion 132 can make full contact with, and hold, the cover plate 12, to realize firm closing of the cover plate 12.

Figure 3:
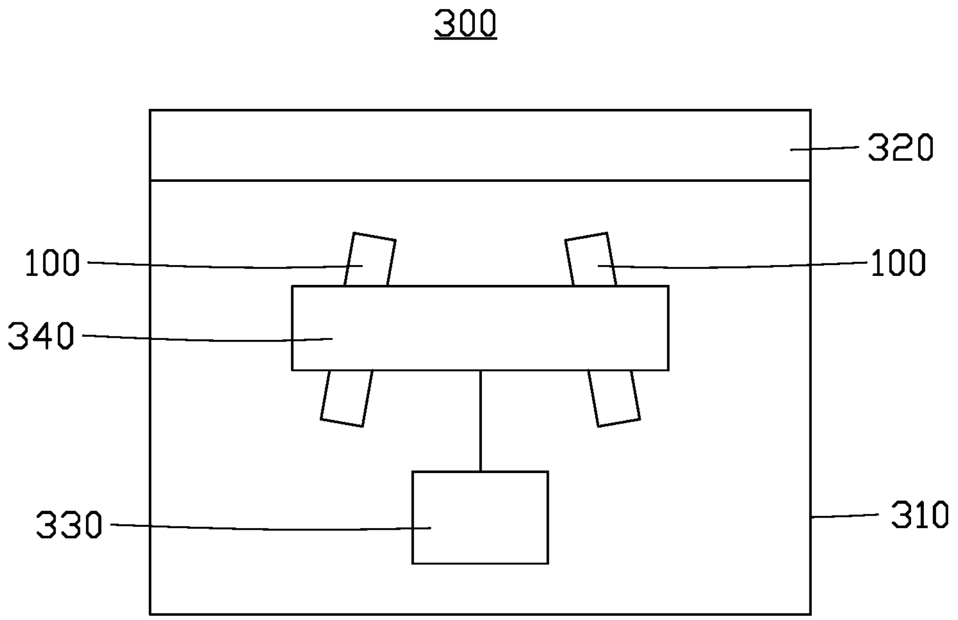
FIG. 3 is a schematic view of a liquid processing device in an embodiment according to the present disclosure.

Referring to FIG. 3, the present disclosure further discloses a liquid processing device 300. The liquid processing device 300 includes a body 310, a top cover 320, a driving device 330, a rotating part 340, and the liquid processing fixture 100. The top cover 320 is connected to the body 310. The driving device 330 is connected to the rotating part 340 to rotate the rotating part 340 in the body.

It should be explained that, the rotating part 340 is positioned in the body 310, and a number of liquid processing fixtures 100 can be evenly positioned around the rotating part 340. When the liquid processing device 300 is in use, the liquid container 200 is positioned in the liquid processing fixture 100, and the top cover 320 is closed to seal the interior of the liquid processing equipment 300. Then, the driving device 330 starts rotating the rotating part 340 around the rotation center to centrifuge the liquid in the liquid container 200.

In one embodiment, the liquid processing fixture 100 is obliquely positioned in the body 310. The bottom of the liquid processing fixture 100 is towards the circumference of the rotating part 340, and the top of the liquid processing fixture 100 is oriented towards the rotation center of the rotating part 340.

Since the liquid processing fixture 100 is obliquely positioned, when the liquid processing device 300 centrifuges the liquid, a centrifugal direction of the liquid processing device 300 has effect at the bottom of the liquid container 200, to improve the quality of processes such as defoaming, and to improve the results of liquid processing.

Even though information and advantages of the present embodiments have been set forth in the foregoing description, together with details of the structures and functions of the present embodiments, the disclosure is illustrative only. Changes may be made in detail, especially in matters of shape, size, and arrangement of parts within the principles of the present embodiments to the full extent indicated by the plain meaning of the terms in which the appended claims are expressed.

What is claimed is:

1. A liquid processing device comprising:

a body;

a top cover connected to the body;

a rotating part positioned in and rotatably connected to the body;

a driving device connected to the rotating part to drive the rotating part to rotate in the body; and a liquid processing fixture positioned on the rotating part, wherein the liquid processing fixture comprises:

a mounting plate, wherein a mounting groove is defined on the mounting plate;

a liquid container, part of the liquid container is received in the mounting groove, the liquid container comprising a containing body and an upper cover, wherein the upper cover is connected to a top portion of the containing body;

a cover plate comprising a first end portion and a second end portion, wherein the first end portion is rotatably connected to the mounting plate, and the cover plate is positioned at a side of the mounting groove, the cover plate is changeable between a closed state to cover the mounting groove and an open state to uncover the mounting groove;

a fixing element connected to the mounting plate, wherein the second end portion is detachably connected to the fixing element;

a baffle and an elastic member, the elastic member connects the baffle and the mounting plate; and a supporting member, the supporting member is sleeved on the containing body and positioned below the upper cover;

the mounting groove defines a first groove, a second groove and a third groove positioned in sequence, areas of the first groove, the second groove and the third groove at respective planes parallel to a radial direction of the first groove increase in size in the sequence;

the supporting member comprises a sleeve portion and a positioning portion, the sleeve portion is received in the first groove, the positioning portion is received in the second groove, a first step surface is formed between the first groove and the second groove, the first step surface abuts the positioning portion; the second groove is located between the first groove and the third groove; a second step surface is formed between the second groove and the third groove and the second step surface abuts the upper cover; the upper cover is received in the third groove.

2. The liquid processing device of claim 1, wherein a plurality of the liquid processing fixtures is positioned around the rotating part.

3. The liquid processing device of claim 1, wherein the liquid processing fixture is obliquely positioned in the body, the bottom of the liquid processing fixture towards the circumference of the rotating part, and the top of the liquid processing fixture towards the rotation center of the rotating part.

4. The liquid processing device of claim 1, wherein a first end of the elastic member is connected to a periphery of the baffle, a second end of the elastic member is connected to the bottom of the mounting plate.

5. The liquid processing device of claim 1, wherein a number of elastic members are positioned and symmetrically distributed on the peripheral side of the baffle.

* * * * *